United States Patent Office 2,970,177
Patented Jan. 31, 1961

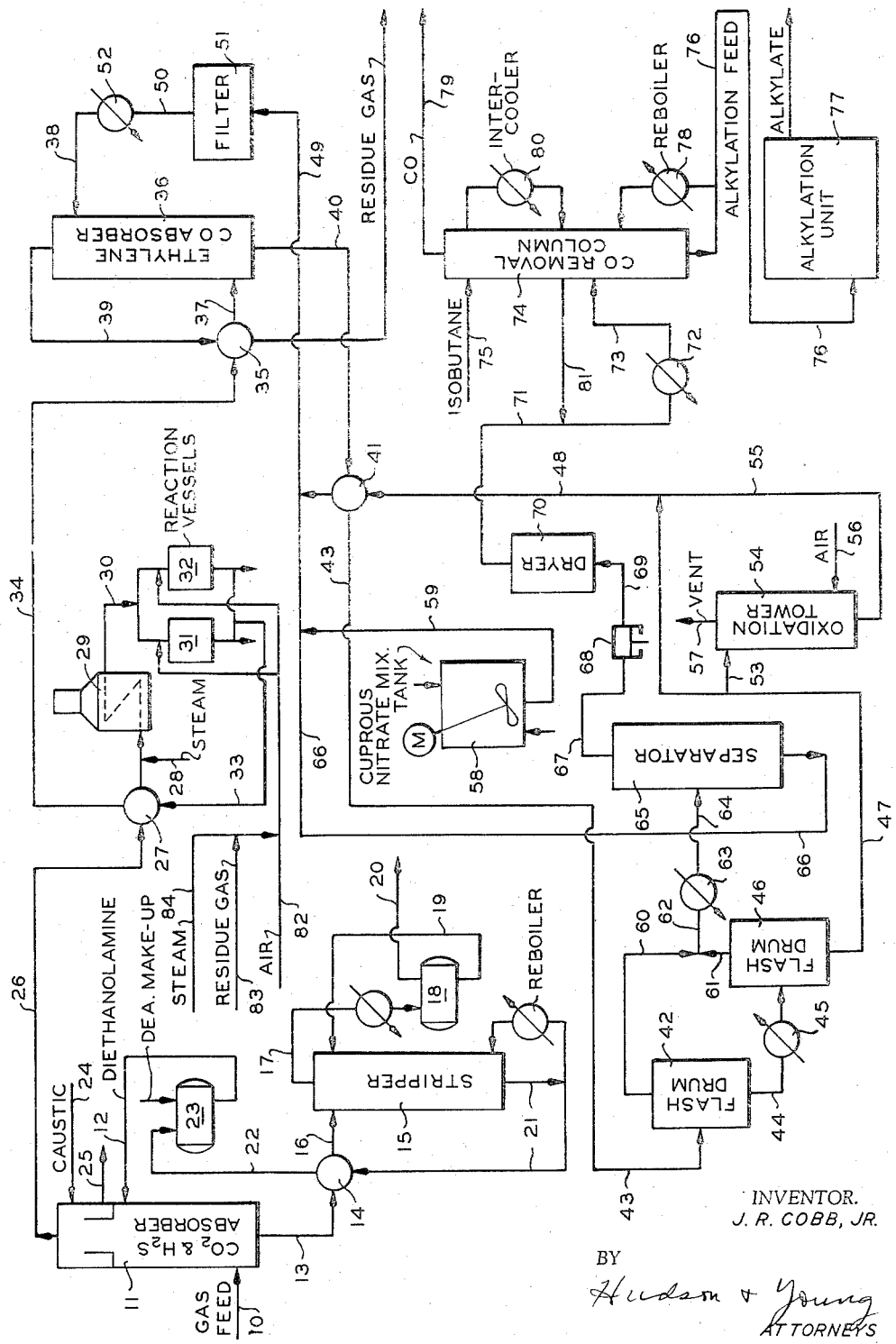

2,970,177

OLEFIN RECOVERY PROCESS

Joseph R. Cobb, Jr., Bartlesville, Okla., assignor to Phillips Petroleum Company, a corporation of Delaware Filed Nov. 6, 1956, Ser. No. 620,750

12 Claims. (Cl. 260—677)

This invention relates to the purification of normally gaseous streams containing normally gaseous olefins. In one aspect, this invention relates to a modus operandi, more fully described hereinafter, permitting the recovery of normally gaseous olefins, and especially ethylene and propylene, from a gaseous stream containing other normally gaseous components, especially carbon monoxide, carbon dioxide, hydrogen sulfide, hydrogen, methane, ethane, propane, acetylene and the like. In another aspect, this invention relates to the production of a low-boiling olefin, especially propylene and particularly ethylene, in admixture with a saturated hydrocarbon, such as a normal paraffin, cycloparaffin, or isoparaffin, as feed for an alkylation or polymerization process. Another aspect of this invention pertains to the alkylation of an alkylatable hydrocarbon, such as an isoparaffin, with an olefin, such as ethylene or propylene. Another aspect of this invention pertains to the catalytic polymerization of an olefin, such as ethylene or propylene, in the presence of a diluent, such as pentane or cyclohexane, to form a high molecular weight semi-solid and/or solid polymer.

Various processes in a refinery, including catalytic cracking processes, produce streams containing normally gaseous olefins, such as ethylene and propylene, as by-products. Usually these olefins are in very low concentrations and are obtained in mixture with other gaseous substances such as carbon dioxide, carbon monoxide, nitrogen, hydrogen sulfide, hydrogen, methane, ethane, propane, acetylene and the like. Ordinarily, it is common practice in the refinery to utilize these gaseous streams as fuel; however, it is apparent that the olefins in these streams would be of value since olefins are particularly valuable as a raw material in various processes. For example, olefins can be polymerized to form heavier hydrocarbons in the motor and aviation fuel and higher boiling range, predominantly $C_8$ and heavier. Also, olefins can be alkylated with an isoparaffin to form valuable gasoline blending components which are utilized in high octane motor and aviation fuels. Another important use of olefins, particular ethylene and propylene, is the production of semi-solid and solid polymeric materials in the presence of a catalyst using a normal paraffin or a cycloparaffin hydrocarbon as a diluent.

Unfortunately, some of the components of these gaseous streams act as catalyst poisons in alkylation and polymerization processes. For example, acetylene, sulfur compounds, and carbon monoxide, even in very minor amounts, cause a substantial reduction in the effectiveness of the catalysts used in alkylation and polymerization processes and these materials must be removed from the olefins if efficient utilization of the catalyst is to be realized. In addition, for most efficient utilization of the process equipment, an olefin-saturated hydrocarbon feed stream free of inert materials is desirable.

It is well known that the low-boiling olefins can be separated from gaseous streams containing the same by contact of the gaseous stream with an aqueous solution of monoethanolamine containing a cuprous salt dissolved therein, whereby the olefins are absorbed by the solution. Thereafter, the absorbed olefins are recovered from the solution by subjecting the rich solution to pressure reduction and heating to desorb the olefins from the solution. The olefin stream recovered is of high purity; however, this recovered olefin stream also contains a substantial amount of carbon monoxide, which, as previously noted, is a catalyst poison in catalytic alkylation and polymerization processes. Thus, because of this presence of carbon monoxide in the olefin stream recovered by absorption in cuprous salt-monoethanol amine solution, the recovered olefin stream has very little usefulness. However, the cuprous salt-monoethanol amine absorption process is very effective in separating and recovering the normally gaseous olefins from the gaseous stream, particularly where the concentration of olefin in the gaseous stream is less than 10 percent, so that it is very desirable to use this separation process.

An object of this invention is to provide a process for the recovery of low-boiling olefins from waste refinery gas streams. Another object of this invention is to provide a modus operandi for recovering olefins free of materials which poison alkylation and polymerization catalysts. Another object of this invention is to provide a modus operandi for recovering olefins in admixture with a saturated hydrocarbon free of carbon monoxide. Another object of this invention is to provide a process for recovering olefins in an especially desirable admixture suitable for alkylation or polymerization. Another object of this invention is to provide an improved process for alkylating an alkylatable hydrocarbon with a normally gaseous olefin. Another object of this invention is to provide an improved process for polymerizing normally gaseous olefins to form hydrocarbons of higher boiling range. Another object of this invention is to provide an improved process for polymerizing normally gaseous olefins to form semi-solid or solid polymeric materials. Another object of this invention is to provide a process for separating normally gaseous olefins from carbon monoxide.

Other objects and aspects of the invention, as well as the several advantages of the invention, are apparent from a consideration of the accompanying disclosure, drawings, and claims.

According to the present invention, there is provided an efficient, practical, and convenient process of recovering normally gaseous olefins, especially propylene and particularly ethylene, from gaseous streams containing carbon monoxide in a concentration greater than 0.05 mol percent and other gaseous substances having deleterious effects in alkylation and polymerization processes by intimately contacting said gaseous stream with a saturated hydrocarbon absorption liquid.

Also, according to the invention, there is provided a modus operandi comprising the steps as follows: removing from a gaseous stream containing olefins, carbon dioxide, carbon monoxide, sulfur compounds, acetylene, and other gases, the carbon dioxide and sulfur compounds; removing from the resulting gas the acetylenes; contacting the last resulting gas with an aqueous cuprous salt-monoethanol amine solution to absorb carbon monoxide and olefins in said aqueous cuprous salt-monoethanol amine solution, and removing said carbon monoxide and said olefins from said last resulting gas; recovering said carbon monoxide and said olefins from said aqueous cuprous salt-monoethanol amine solution as a single gas stream; contacting said single gas stream containing said carbon monoxide and said olefins with a saturated hydrocarbon absorption liquid under conditions to separate said carbon monoxide from said olefins and to form an admixture of said olefins in said saturated hydrocarbon; and recovering said admixture of said olefins in said saturated hydrocarbon as a suitable feed for an alkylation or a polymerization process.

Further, according to the invention, there is provided a process for recovering a normally gaseous, low-boiling olefin from a gaseous stream containing said olefin, carbon monoxide, and other gases in a very advantageous form suitable as feed for an alkylation or a polymerization process. By operating according to this invention, olefins are recovered in admixture with saturated hydrocarbon, such as a normal paraffin, isoparaffin or cycloparaffin, in a concentration in said saturated hydrocarbon which is a suitable feed stream, depending upon the particular saturated hydrocarbon used, in either an alkylation process wherein an alkylatable isoparaffin hydrocarbon is alkylated with a normally gaseous olefin, a polymerization process wherein a normally gaseous olefin is polymerized to form saturated hydrocarbons of higher boiling range, or a polymerization process wherein a normally gaseous olefin is polymerized to form semi-solid or solid polymeric materials. Thus, in the practice of this invention, a normal paraffin, isoparaffin, or cycloparaffin hydrocarbon first serves as an absorption liquid to effect a separation of the olefins from carbon monoxide and then serves either as a reactant or as a diluent in the subsequent alkylation or polymerization process.

A more complete understanding of the invention will be obtained by reference to the accompanying schematic drawing which shows a preferred embodiment of the process. The practice of the invention is illustrated with a gaseous stream containing ethylene, hydrogen sulfide, carbon dioxide, acetylene, and carbon monoxide from which an admixture containing ethylene and isobutane is obtained as a feed for an alkylation process.

Referring now to the drawing, a cracked gas mixture containing both saturated and unsaturated normally gaseous hydrocarbons and carbon monoxide is obtained from a source not shown and is passed through line 10 to absorber column 11 where the gas feed is countercurrently contacted with an aqueous solution of diethanolamine entering through line 12. The pressure in absorber column 11 is maintained at 210 p.s.i.a. at the top of the column and 215 p.s.i.a. at the bottom of the column. The temperature in absorber column 11 is 100° F. at the top of the column and 122° F. at the bottom. The rich diethanolamine is removed from column 11 by line 13 and heated in heat exchanger 14 before being passed into stripper column 15 through line 16. In stripper column 15, carbon dioxide and hydrogen sulfide are separated from the solvent and removed through line 17. Any diethanolamine solvent in this stripper effluent stream is separated out in separator 18 and returned to stripper column 15 via line 19. The carbon dioxide and hydrogen sulfide are flared through line 20. The lean diethanolamine solvent is recovered from stripper column 15 via line 21 and, after passing through heat exchanger 14 to heat the rich solvent stream in line 13, recycled to absorber column 11 via lines 22 and 12. Make-up diethanolamine is supplied through tank 23. Stripper column 15 is operated at a pressure of 21 p.s.i.a. and a temperature of 218° F. In absorber column 11, partially purified gases leave the lower section of column 11 and pass into the upper section where these gases are countercurrently contacted with a 5 percent by weight sodium hydroxide solution entering through line 24. In this upper section of column 11, residual carbon dioxide and hydrogen sulfide are absorbed by the sodium hydroxide solution which is discarded through line 25. A gaseous stream free of carbon dioxide and hydrogen sulfide is removed from absorber column 11 via line 26 and passed to the acetylene removal unit.

Acetylenes in the gaseous stream are removed by selective hydrogenation using a catalyst of iron oxide promoted with chromium oxide and an alkali to form olefins. Since the concentration of acetylenes in the gaseous stream is very small and the stream already contains a substantial amount of hydrogen, additional hydrogen is not necessary for the selective hydrogenation reaction. The gaseous stream, freed of carbon dioxide and hydrogen sulfide, is heated in heat exchanger 27 mixed with steam entering via line 28, further heated in furnace 29 to a temperature of 595° F., and passed via line 30 to one of the two reaction vessels 31 and 32. The pressure of the gas in line 30 is 204 p.s.i.a. Two reaction vessels are provided so that one can be regenerated while the other is on stream to effect the hydrogenation of the acetylenes. In reaction vessels 31 and 32, the gases are contacted with a ferric oxide-chromic oxide-potassium carbonate catalyst having a composition of 87 percent by weight $Fe_2O_3$, 3 percent by weight $Cr_2O_3$ and 10 percent by weight KOH. Prior to use, the catalyst is reduced by hydrogen at 950° F. The effluent from reaction vessels 31 and 32 is removed via line 33 and, after passing through heat exchanger 27 to heat the incoming gas stream to the acetylene removal unit, is passed via line 34 to the ethylene-carbon monoxide removal step. For purposes of regeneration of the catalyst in reaction vessels 31 and 32, air, residue gas, and steam are supplied via lines 82, 83 and 84, respectively.

The gaseous stream removed from the acetylene removal unit via line 34 is free of carbon dioxide, hydrogen sulfide, and acetylene. After cooling in heat exchanger 35, this gaseous stream is introduced near the bottom of absorber column 36 through line 37 and countercurrently contacted with a cuprous nitrate-monoethanolamine solution admitted via line 38 near the top of column 36. The ethylene and carbon monoxide are absorbed in the cuprous nitrate-monoethanolamine solution, and the denuded gas or residue gas is discharged through line 39 and discarded after passing through heat exchanger 35 and cooling the incoming gaseous stream entering column 36 through line 37. The temperature in absorber column 36 is maintained at 48° F. at the top of the column. The pressure at the top of the column is 180 p.s.i.a.

The enriched cuprous nitrate-monoethanolamine solution is withdrawn from the bottom of absorber column 36 and passed by line 40 through heat exchanger 41 into flash drum 42 via line 43. In flash drum 42, the enriched cuprous nitrate-monoethanolamine solution is flashed at a temperature of 140° F. and a pressure of 44.2 p.s.i.a. Bottoms from flash drum 42 pass via line 44 and heater 45 to flash drum 46. The bottoms from flash drum 46, comprising lean cuprous nitrate-monoethanolamine solution, is returned to absorber column 36 via lines 47, 48, 49, 50 and 38. In returning to absorber column 36, the solution is cooled in heat exchanger 41, thereby heating the enriched solution in line 40 to be flashed, filtered in filter 51 and further cooled in cooler 52. A portion of the flashed cuprous nitrate-monoethanolamine solution is separated from line 47 via line 53, passed through oxidation tower 54, and returned to line 48 via line 55. Oxidation tower 54 is packed with Raschig rings and air is introduced at the bottom via line 56 and discarded through line 57. In oxidation tower 54, a portion of the cuprous nitrate in the solution is oxidized to form cupric nitrate and the return of this cupric nitrate-monoethanolamine solution to line 48 results in there being a low concentration of cupric ion in the cuprous nitrate-monoethanolamine solution returned to absorber 36 so that cuprous ion is not reduced to metal and copper removed from the solution. Make-up cuprous nitrate-monoethanolamine solution is supplied from mix tank 58 via line 59. For efficient operation, the total copper content of the cuprous nitrate-monoethanolamine solution is maintained in the range of 8 to 15 weight percent and more desirably in the range of 10 to 12 weight percent.

The overhead streams from flash drums 42 and 46 are removed through lines 60 and 61, respectively, combined in line 62, cooled in cooler 63, and passed through line 64 into separator 65. This overhead comprises primarily ethylene and carbon monoxide, together with some propylene and any entrained cuprous nitrate-monoethanolamine solution. The entrained solution separates out in separator 65 and is returned to absorber column 36 by way of line 66. The overhead fraction from separator 65 is removed by line 67, compressed to a pressure of 434 p.s.i.a. in compressor 68, and passed via line 69 into dryer 70, which contains activated alumina supported on cellite. Any moisture which might be present in the stream is removed in dryer 70 and the ethylene-carbon monoxide stream is passed through line 71, cooler 72, and line 73 into carbon monoxide removal column 74. In this column, the ethylene-carbon monoxide stream is contacted countercurrently with a stream of isobutane introduced into the top of column 74 through line 75. In column 74, which is filled with Raschig rings, the ethylene is absorbed in the isobutane and is removed from the bottom of column 74 via line 76 and supplied to alkylation unit 77 as a suitable feed. In alkylation unit 77, which is not shown in detail in the drawing, the isobutane and ethylene are alkylated using an aluminum chloride catalyst to produce 2,3-dimethylbutane.

Carbon monoxide column 74 is operated with a pressure of 416 p.s.i.a. at the top of the column and a temperature of 48° F. and 93° F. at the top and bottom, respectively, of column 74. Temperature in the center sections of column 74 is regulated by means of intercooler 80 and by recycle of a portion of the fluid in the column into feed inlet line 71 via line 81. The column is operated with enough reboiling by means of reboiler 78 to eliminate carbon monoxide from the ethylene-isobutane admixture removed via line 76. The carbon monoxide leaves the top of column 74 via line 79 and is discarded.

When operating at the temperatures and pressures indicated on the drawing, which represent desired operating conditions for this embodiment, the various stream compositions and flow rates obtained are presented in Table I, in units of mols per stream day.

TABLE I

| Stream No. | 10 | 12 | 13 | 20 | 24 | 26 | 37 | 39 | 38 |
|---|---|---|---|---|---|---|---|---|---|
| $H_2$ | 11,310 | | | | | 11,310 | 11,248 | 11,248 | |
| $CH_4$ | 16,750 | | | | | 16,750 | 16,750 | 16,672 | |
| $C_2H_2$ | Trace | | | | | Trace | | | |
| $C_2H_4$ | 6,170 | | | | | 6,170 | 6,108 | 185 | 697 |
| $C_2H_6$ | 12,090 | | | | | 12,090 | 12,152 | 12,096 | |
| $C_3H_6$ | 2,800 | | | | | 2,800 | 2,800 | 2,522 | 33 |
| $C_3H_8$ | 2,240 | | | | | 2,240 | 2,240 | 2,230 | |
| i-$C_4H_8$ | 256 | | | | | 256 | 256 | 242 | 1 |
| n-$C_4H_8$ | 496 | | | | | 496 | 496 | 447 | 6 |
| i-$C_4H_{10}$ | 886 | | | | | 886 | 886 | 882 | |
| i-$C_5H_{12}$ | 240 | | | | | 240 | 240 | 239 | |
| $C_6+$ | 32 | | | | | 32 | 32 | 32 | |
| $N_2$ | 1,509 | | | | | 1,509 | 1,509 | 1,509 | |
| CO | 371 | | | | | 371 | 371 | 1 | 40 |
| $CO_2$ | 566 | | 522 | 522 | | | | | |
| $H_2S$ | 1,562 | | 1,560 | 1,560 | | | | | |
| DEA | | 5,952 | 5,952 | | | | | | |
| $NH_4NO_3$ | | | | | | | | | 7,487 |
| $Cu(NO_3)_2$ | | | | | | | | | 1,001 |
| $CuNO_3$ | | | | | | | | | 15,949 |
| MEA | | | | | | | | | 56,294 |
| NaOH | | | | | 69 | | | | |
| $H_2O$ | 254 | 138,883 | 138,886 | 175 | 1,312 | 251 | 268 | 41 | 90,696 |
| Mols/SD | 57,532 | 144,835 | 146,920 | 2,257 | 1,381 | 55,401 | 55,356 | 48,346 | 172,204 |

| Stream No. | 40 | 47 | 64 | 69 | 73 | 76 | 79 | 75 |
|---|---|---|---|---|---|---|---|---|
| $H_2$ | | | | | | | | |
| $CH_4$ | 78 | | 78 | 78 | 78 | 44 | 34 | |
| $C_2H_2$ | | | | | | | | |
| $C_2H_4$ | 6,620 | 697 | 5,923 | 5,923 | 5,923 | 5,916 | 7 | |
| $C_2H_6$ | 56 | | 56 | 56 | 56 | 56 | | |
| $C_3H_6$ | 311 | 33 | 278 | 278 | 278 | 278 | | |
| $C_3H_8$ | 10 | | 10 | 10 | 10 | 10 | | |
| i-$C_4H_8$ | 15 | 1 | 14 | 14 | 14 | 14 | | |
| n-$C_4H_8$ | 55 | 6 | 49 | 49 | 49 | 49 | | |
| i-$C_4H_{10}$ | 4 | | 4 | 4 | 4 | 6,931 | 73 | 7,000 |
| i-$C_5H_{12}$ | 1 | | 1 | 1 | 1 | 1 | | |
| $C_6+$ | | | | | | | | |
| $N_2$ | | | | | | | | |
| CO | 410 | 40 | 370 | 370 | 370 | | 370 | |
| $CO_2$ | | | | | | | | |
| $H_2S$ | | | | | | | | |
| DEA | | | | | | | | |
| $NH_4NO_3$ | 7,487 | 7,487 | | | | | | |
| $Cu(NO_3)_2$ | 1,001 | 1,001 | | | | | | |
| $CuNO_3$ | 15,949 | 15,949 | | | | | | |
| MEA | 56,294 | 56,294 | | | | | | |
| NaOH | | | | | | | | |
| $H_2O$ | 90,923 | 90,397 | 526 | 8 | | | | |
| Mols/SD | 179,214 | 171,905 | 7,309 | 6,791 | 6,783 | 13,299 | 484 | 7,000 |

It will be evident to one skilled in the art in possession of this disclosure that the temperatures and pressures employed in the different process equipment in the specific embodiment shown in the drawing can be varied within certain ranges of conditions. Thus, the pressure in carbon dioxide and hydrogen sulfide absorber column 11 usually can be a pressure in the range of 75–500 p.s.i.a.; however, the pressure used depends to a large extent upon the pressure of the olefin-containing feed gas and a pressure outside this range can be used. The temperature in absorber column 11 can be varied over a wide range and usually any temperature readily available with cooling water is satisfactory. In stripper column 15, wherein carbon dioxide and hydrogen sulfide are separated from the diethanolamine solvent, a pressure in the range of atmospheric pressure or above is used and the temperature is maintained in the range of 150–250° F.

In the acetylene removal step using an alkali-promoted iron oxide-chromium oxide catalyst to selectively hydrogenate acetylenes, a reaction temperature in the range of 300–650° F. and a pressure in the range of 0–900 p.s.i.a., preferably in the range of 150–750 p.s.i.a., is employed in reaction vessels 31 and 32. Usually, a space velocity in the range of 25 v./v./hr. to 2400 v./v./hr. is maintained in the reaction vessels. This acetylene removal process is set forth, described and claimed in application, Serial Number 363,400, filed June 22, 1953, now Patent No. 2,775,634.

In olefin-carbon monoxide absorption column 36, the temperature is maintained in the range of about 45–140° F. and preferably a temperature below about 100° F. is used. At temperatures above about 140° F. the cuprous salt-monoethanolamine solution deteriorates rapidly so that the upper temperature level employed must be carefully regulated. The pressure in column 36 is maintained in the range of 100–500 p.s.i.a. Preferably the cuprous salt employed in the aqueous cuprous salt-monoethanolamine solution is cuprous nitrate; however, other cuprous salts such as the chloride, acetate, formate, carbonate, oxalate, benzoate, benzolsulfonate, anthranalate, salicylate and the like can also be used. For efficient operation, the total copper content of the solution is maintained in the range of 8–15 weight percent. In order to avoid copper deposition it is essential to maintain at least a small amount of cupric ion in the solution.

The temperature and pressure conditions maintained in carbon monoxide removal column 74 depend primarily upon the particular saturated hydrocarbon used as the absorption liquid. The pressure must be sufficient to maintain the hydrocarbon absorption liquid in liquid phase; however, so long as this condition is satisfied, the pressure used depends upon the pressure desired for the ultimate use of the olefin-hydrocarbon admixture. Broadly, a temperature in the range of 25–200° F. and a pressure in the range of 100–550 p.s.i.a. is maintained at the top of column 74. When isobutane is the absorption liquid, a temperature of 48° F. at the top of the column and 93° F. at the bottom of the column and a pressure of 416 p.s.i.a. at the top of the column is maintained. When cyclohexane is used as the absorption liquid, temperatures of 100° F. and 170° F. are maintained respectively at the top and bottom of the column and a pressure of 500 p.s.i. is maintained at the top of the column. Generally, a temperature in the range of 25–100° F. is maintained at the top of the column when either a normal paraffin or an isoparaffin is used as the hydrocarbon absorption liquid and a temperature in the range of 60–100° F. is maintained at the top of the column when a cycloparaffin is used as the hydrocarbon absorption liquid.

The hydrocarbon employed as absorption liquid in carbon monoxide removal column 74 is completely saturated and has from 3 to 12 carbon atoms per molecule. Examples of such saturated hydrocarbons are the normal paraffins, isoparaffins, and cycloparaffins. Examples of some normal paraffins which have been found very suitable are n-propane, n-butane, n-pentane, n-hexane, and n-octane. Some isoparaffins which have been found very suitable are isobutane, isopentane, isohexane, and isoheptane. Cyclohexane, methylcyclohexane, and cyclopentane are some of the cycloparaffins which have been found suitable.

The choice of the type and particular hydrocarbon is determined by the subsequent process in which the olefin-hydrocarbon admixture is used as feed. Thus, the hydrocarbon is usually isobutane or isopentane when a subsequent alkylation step is performed, cyclohexane or normal pentane when a subsequent polymerization step to produce solid polymers is performed, and normal butane or normal pentane where a subsequent polymerization step to produce hydrocarbons having a higher boiling range is performed.

An important feature of the invention is the recovery of the olefin in admixture in proper proportion with the hydrocarbon absorption liquid whereby the olefin-hydrocarbon admixture can be used directly in a subsequent process as a feed stream without effecting a separation of the olefin from the hydrocarbon. Thus, in a subsequent alkylation process, isoparaffin hydrocarbon in admixture with olefin serves as a reactant and is alkylated with the olefin to form heavier hydrocarbons in the motor and aviation fuel range of molecular weight. In a subsequent polymerization process to produce a higher boiling hydrocarbon, the normal paraffin hydrocarbon in admixture with the olefin functions as an inert diluent during the polymerization step and also to enable liquid phase conditions to be maintained therein without excessive pressures and even though the polymerization is above the critical temperature of the olefin. In a subsequent polymerization process wherein the olefin is polymerized by contact with a solid catalyst to form a solid and/or semi-solid polymeric material, the normal paraffin, isoparaffin, or cycloparaffin hydrocarbon in admixture with the olefin functions as a diluent and aids in removal of the polymer products from the reactor.

The alkylation step in which the olefin-isoparaffin admixture is used can be carried out catalytically employing an inorganic acid such as substantially anhydrous hydrofluoric acid or concentrated sulfuric acid as the catalyst. The alkylation step is very often performed using either an aluminum chloride, an aluminum chloride-hydrocarbon complex, or a boron fluoride alkylation catalyst. When employing an aluminum chloride-hydrocarbon complex as a catalyst, the alkylation step is usually carried out at a temperature in the range of about 50 to 200° F. using a pressure sufficient to maintain liquid phase conditions within the reactor. The volume ratio of hydrocarbons to catalyst in the reaction zone ranges between about 9:1 and about 1:1. The mol ratio of isoparaffin to olefin is usually maintained in the range of 3:1 to 10:1.

The polymerization process wherein hydrocarbons having a higher boiling point are produced is usually conducted catalytically using a nickel-containing catalyst. A very suitable catalyst is activated nickel oxide supported on a suitable carrier, as is described in Bailey et al., U.S. Patent 2,381,198 (1945). Other polymerization catalysts such as boron fluoride and aluminum chloride can also be used. The reaction conditions when employing an activated nickel oxide catalyst usually comprise a temperature in the range of 0–437° F., preferably 120–300° F., pressure in the range of atmospheric to 2000 p.s.i.a. and a contact time in the range of 30 seconds to 3 hours.

The polymerization process wherein semi-solid and/or solid polymeric materials are produced is usually conducted using a chromium or molybdenum supported catalyst. A particularly advantageous catalyst and process of using the same is set forth and claimed in application Serial Number 476,306, filed December 20, 1954 and now abandoned. When employing such a catalyst, a temperature in the range of about 150–450° F., a pressure in the range of about 100 to 300 p.s.i., and a space velocity of from 0.1 to 20 liquid hourly space velocity is used.

One feature of the invention is the modus operandi including the steps of removing the carbon dioxide, sulfur compounds, and acetylenes from the gaseous stream prior to absorption of the carbon monoxide and light olefin gases in the cuprous salt-monoethanolamine solution. Although this sequence of steps has been described in a specific embodiment as comprising the use of diethanolamine and caustic solution to remove carbon dioxide and sulfur compounds and a selective hydrogenation process for removing acetylene, it is obvious that the invention is not limited to these specific purification steps. For example, hydrogen sulfide can be removed by passing the gas through beds of iron oxide. Also, hydrogen sulfide and carbon dioxide can be removed together by absorption in potassium or sodium carbonate solution. Acetylene can be removed by any of the well known solvent extraction processes such as extracting with dimethyl formamide solvent. Also, acetylene can be removed in a selective hydrogenation process using a chromium oxide or a calcium nickel phosphate catalyst.

Reasonable variation and modification are possible within the scope of the foregoing disclosure, drawing, and appended claims to the invention, the essence of which is (1) that a normally gaseous olefin is advantageously separated from carbon monoxide by contact with a saturated hydrocarbon absorption liquid; (2) that normally gaseous olefins are advantageously recovered from gaseous streams containing at least 0.05 mol percent carbon monoxide, carbon dioxide, acetylenes, gaseous sulfur compounds, and other gaseous substances by a sequence of steps set forth and described; and (3) that normally gaseous olefins are recovered from gaseous streams containing the same and carbon monoxide in a very advantageous form in admixture with a saturated hydrocarbon for use directly in either a subsequent alkylation or polymerization process.

I claim:

1. A process for the recovery of a normally gaseous olefin from a gas stream containing the same together with other gases comprising carbon monoxide, carbon dioxide, acetylenes, and hydrogen sulfide, which comprises subjecting said gas stream to a purification step to remove therefrom hydrogen sulfide and carbon dioxide; subjecting the resulting hydrogen sulfide and carbon dioxide-free gas stream to a purification step to remove therefrom acetlyenes; contacting the last resulting gas stream with an aqueous cuprous salt-monoethanolamine solution to absorb therein carbon monoxide and said normally gaseous olefin; recovering said carbon monoxide and said normally gaseous olefin from said aqueous cuprous salt-monoethanolamine solution as a single gas stream; contacting said single gas stream with a saturated hydrocarbon absorption liquid having 3–12 carbon atoms per molecule selected from the group consisting of isoparaffins and cycloparaffins under conditions to separate said carbon monoxide from said normally gaseous olefin and to form an admixture of said normally gaseous olefin in said hydrocarbon absorption liquid; and recovering said admixture of said normally gaseous olefin in said hydrocarbon as a suitable feed for utilization in a subsequent process in which said normally gaseous olefin is reacted.

2. The process of claim 1 wherein said purification step to remove hydrogen sulfide and carbon dioxide comprises contacting said gas stream with diethanolamine and aqueous caustic solution, and said purification step to remove acetylenes comprises subjecting said first resulting gas stream to selective hydrogenation.

3. The process of claim 2 wherein said normally gaseous olefin is ethylene, said saturated hydrocarbon absorption liquid is an isoparaffin, and said subsequent process is alkylation.

4. The process of claim 2 wherein said normally gaseous olefin is ethylene, said saturated hydrocarbon absorption liquid is a cycloparaffin, and said subsequent process is polymerization wherein semi-solid and solid polymeric materials are formed.

5. The process of claim 2 wherein said normally gaseous olefin is propylene, said saturated hydrocarbon absorption liquid is a cycloparaffin, and said subsequent process is polymerization.

6. The process of claim 3 wherein said aqueous cuprous salt-monoethanolamine solution is aqueous cuprous nitrate-monoethanolamine solution and said isoparaffin is isobutane.

7. The process of claim 3 wherein said aqueous cuprous salt-monoethanolamine solution is aqueous cuprous nitrate-monoethanolamine solution and said isoparaffin is isopentane.

8. The process of claim 4 wherein said aqueous cuprous salt-monoethanolamine solution is aqueous cuprous nitrate-monoethanolamine solution and said cycloparaffin is cyclohexane.

9. The process of claim 4 wherein said aqueous cuprous salt-monoethanolamine solution is aqueous cuprous nitrate-monoethanolamine solution and said cycloparaffin is alkylcyclohexane.

10. The process of claim 2 wherein said normally gaseous olefin is propylene, said saturated hydrocarbon absorption liquid is an isoparaffin, and said subsequent process is alkylation.

11. A process for the recovery of ethylene from a gas stream containing the same together with other gases comprising carbon monoxide, carbon dioxide, acetylenes, and hydrogen sulfide, which comprises contacting said gas stream with diethanolamine and aqueous caustic solution to remove from said gas stream hydrogen sulfide and carbon dioxide; contacting the resulting hydrogen sulfide and carbon dioxide-free gas stream with a ferric oxide-chromic oxide-potassium carbonate catalyst in the presence of hydrogen to selectively hydrogenate said acetylenes; contacting the resulting acetylenes-free gas stream with an aqueous cuprous nitrate-monoethanolamine solution to absorb therein said carbon monoxide and ethylene; recovering said carbon monoxide and ethylene from said aqueous cuprous nitrate-monoethanolamine solution as a single gas stream; contacting said single gas stream with cyclohexane under conditions to separate said carbon monoxide from said ethylene and to form an admixture of said ethylene in said cyclohexane; and recovering said admixture of ethylene and cyclohexane as a suitable feed for utilization in a polymerization process wherein semi-solid and solid polymeric materials rae formed.

12. A process for the recovery of propylene from a gas stream containing the same together with other gases comprising carbon monoxide, carbon dioxide, acetylenes, and hydrogen sulfide, which comprises contacting said gas stream with diethanolamine and aqueous caustic solution to remove from said gas stream hydrogen sulfide and carbon dioxide; contacting the resulting hydrogen sulfide and carbon dioxide-free gas stream with a ferric oxide-chromic oxide-potassium carbonate catalyst in the presence of hydrogen to selectively hydrogenate said acetylenes; contacting the resulting acetylenes-free gas stream with an aqueous cuprous nitrate-monoethanolamine solution to absorb therein said carbon monoxide and propylene; recovering said carbon monoxide and propylene from said aqueous cuprous nitrate-monoethanolamine solution as a single gas stream; contacting said single gas stream with isobutane under conditions to separate said carbon monoxide from said propylene and to form an admixture of said propylene in said isobutane; and recovering said admixture of propylene and isobutane as a suitable feed for utilization in an alkylation process.

References Cited in the file of this patent

UNITED STATES PATENTS

| | | |
|---|---|---|
| Re. 18,958 | Bottoms | Sept. 26, 1933 |
| 1,842,010 | Braus | Jan. 19, 1932 |
| 2,005,500 | Joshua et al. | June 18, 1935 |
| 2,321,666 | Felbeck | June 15, 1943 |
| 2,364,377 | Lawrence | Dec. 5, 1944 |
| 2,376,239 | Evans | May 15, 1945 |
| 2,661,812 | Gilmore | Dec. 8, 1953 |
| 2,736,756 | Elgin | Feb. 28, 1956 |
| 2,785,045 | Shen Wu Wan et al. | Mar. 12, 1957 |

OTHER REFERENCES

Altieri: "Gas Analysis and Testing of Gaseous Materials," publ. by the American Gas Association, Inc., N.Y., 1st ed., 1945, pp. 30, 42.